United States Patent
Deperraz et al.

(10) Patent No.: US 8,714,199 B2
(45) Date of Patent: May 6, 2014

(54) METHOD AND APPARATUS FOR ACTUATING A VALVE

(75) Inventors: Nicolas Deperraz, Bons en Chablais (FR); Julien Solioz, Sierre (CH); Michael Baumgartner, Morges (CH)

(73) Assignee: Fluid Automation Systems SA, Versoix (CH)

( * ) Notice: Subject to any disclaimer, the term of this patent is extended or adjusted under 35 U.S.C. 154(b) by 0 days.

(21) Appl. No.: 13/321,742

(22) PCT Filed: Jun. 11, 2010

(86) PCT No.: PCT/EP2010/003504
§ 371 (c)(1),
(2), (4) Date: Nov. 21, 2011

(87) PCT Pub. No.: WO2010/142452
PCT Pub. Date: Dec. 16, 2010

(65) Prior Publication Data
US 2012/0160334 A1   Jun. 28, 2012

(30) Foreign Application Priority Data

Jun. 11, 2009   (FR) ...................................... 09 53912

(51) Int. Cl.
*F15C 1/08*   (2006.01)

(52) U.S. Cl.
USPC ............... 137/840; 137/841; 251/11; 251/75; 251/129.06; 251/319

(58) Field of Classification Search
USPC ............ 251/11, 75, 81, 129.01, 129.06, 319, 251/238, 241, 243; 137/625.44, 870, 871
See application file for complete search history.

(56) References Cited

U.S. PATENT DOCUMENTS

| | | | | |
|---|---|---|---|---|
| 2,881,602 A | * | 4/1959 | Baker et al. | 464/35 |
| 3,441,115 A | * | 4/1969 | Gunther | 464/36 |
| 3,613,732 A | * | 10/1971 | Willson et al. | 137/625.44 |
| 3,974,844 A | * | 8/1976 | Pimentel | 137/1 |
| 4,627,567 A | * | 12/1986 | Thorn | 236/34.5 |
| 4,772,807 A | | 9/1988 | Bouvet | |
| 5,295,509 A | * | 3/1994 | Suto et al. | 137/625.33 |
| 5,325,880 A | * | 7/1994 | Johnson et al. | 137/1 |
| 5,622,482 A | * | 4/1997 | Lee | 417/321 |
| 5,684,448 A | * | 11/1997 | Jacobsen et al. | 337/140 |

(Continued)

FOREIGN PATENT DOCUMENTS

DE   10257549 B3   8/2004
EP   0228328 A1   7/1987

*Primary Examiner* — John K Fristoe Jr.
*Assistant Examiner* — Matthew W Jellett
(74) *Attorney, Agent, or Firm* — The Ollila Law Group LLC

(57) ABSTRACT

A valve (100) is provided according to an embodiment of the invention. The valve (100) comprises a body (102) including a plurality of ports (204, 205, 206). The valve (100) also comprises a valve actuator (150) positioned within the body (102). The valve actuator (150) includes a slider (110) and one or more shape memory alloy elements (112a, 112b). The one or more shape memory alloy elements (112a, 112b) are coupled to at least one side (113, 114) of the slider (110). The slider (110) is movable between a first position and at least a second position upon energizing at least one of the shape memory alloy elements (112a, 112b) of the one or more shape memory alloy elements (112a, 112b) in order to actuate the valve (100).

18 Claims, 3 Drawing Sheets

(56) References Cited

U.S. PATENT DOCUMENTS

| | | | |
|---|---|---|---|
| 6,003,836 A * | 12/1999 | Cewers | 251/129.06 |
| 6,019,113 A * | 2/2000 | Allston et al. | 137/1 |
| 6,318,641 B1 * | 11/2001 | Knebel et al. | 239/5 |
| 6,679,263 B2 * | 1/2004 | Luchetti et al. | 128/207.15 |
| 6,742,761 B2 * | 6/2004 | Johnson et al. | 251/11 |
| 6,843,465 B1 * | 1/2005 | Scott | 251/129.06 |
| 7,815,161 B2 * | 10/2010 | Saitoh et al. | 251/11 |
| 2001/0007265 A1 * | 7/2001 | Itzhaky | 137/883 |
| 2003/0230346 A1 * | 12/2003 | Dorfler et al. | 137/870 |
| 2007/0023089 A1 | 2/2007 | Beyerlein et al. | |
| 2009/0250021 A1 * | 10/2009 | Zarrabi et al. | 123/90.11 |

* cited by examiner

METHOD AND APPARATUS FOR ACTUATING A VALVE

TECHNICAL FIELD

The present invention relates to a valve, and more particularly, to a valve actuated using a shape memory alloy component.

BACKGROUND OF THE INVENTION

Fluid handling devices are becoming increasingly popular and there is an increased demand for fluid handling devices that are both portable and easy to use. Portable fluid handling devices are being used for applications such as home care, point of care testing, fuel cells, fragrance dispensers, etc. In order for a portable fluid handling device to be effective and efficient, it should be light weight, small in size, consume minimal power, operate with low noise, and be cost effective to manufacture. In many applications, it is also important that the fluid handling device provide an accurate and consistent fluid distribution. Therefore, it is necessary to incorporate an efficient fluid valve in the fluid handling device. In many aspects, the fluid valve characterizes the device's efficiency.

One solution of a portable valve that attempts to meet the above criteria is a miniature solenoid valve. The miniature solenoid valve however, is not as effective as originally anticipated. Solenoid valves are typically limited in size and in order to obtain adequate performance, a solenoid valve typically consumes a substantial amount of power. The power consumption of a solenoid valve, in some circumstances, is unacceptable, especially when using batteries as a power source, for example. The batteries may not be able to provide power to the valve for a sufficient length of time. Furthermore, in some applications, it may be desirable to retain the valve in a specific open or mid-point position. If this position requires continuous actuation of the solenoid, the valve will likely consume a substantial amount of power thereby increasing the cost associated with operating the valve.

Another solution has been the use of electrically actuated piezo valves. Some piezo valves operate using a closing arm that seals against a sealing shoulder when the piezo element is de-activated. These valves typically require a substantial amount of space to operate and may not always provide an adequate solution as they are subject to clogging when used with liquids that may dry around the orifice.

Another solution could be to use a stepper motor to actuate a valve (shear valves for example) but it is a bigger and more expensive solution.

Yet another solution has been the use of shape memory alloys that transform shape and/or size when heated. Shape memory alloys provide an advantage over the prior art solutions as they can typically be manufactured smaller and also generally consume less power. Although shape memory alloy actuated valves provide an advantage over traditional designs, there is a need for a shape memory alloy actuated valve that can be held in an actuated position without the continuous supply of power to the valve. The present invention overcomes this and other problems and an advance in the art is achieved. A shape memory alloy element is utilized in a valve where the shape memory alloy element can actuate the valve from a first position to a second position. Upon de-energizing the shape memory alloy element, the valve of the present invention is capable of retaining the new position. Therefore, the valve can stay in an actuated position without requiring a continuous supply of power.

ASPECTS

According to an aspect of the invention, a valve comprises:
a body including a plurality of ports;
a valve actuator positioned within the body, including:
  a slider; and
  one or more shape memory alloy elements coupled to at least one side of the slider, wherein the slider is movable between a first position and at least a second position upon energizing at least one of the one or more shape memory alloy elements in order to actuate the valve.

Preferably, the valve further comprises a cover coupled to the body.

Preferably, the shape memory alloy element is also coupled to the cover.

Preferably, the valve further comprises a biasing member positioned between the cover and the slider.

Preferably, the valve further comprises a fluid control member coupled to the slider and movable between a rest position and at least a first actuated position.

Preferably, the valve further comprises one or more poppet members coupled to a fluid control member.

Preferably, the valve further comprises one or more nozzles configured to seal against one or more poppet members.

Preferably, the valve further comprises a gasket including a plurality of apertures corresponding to the plurality of ports.

Preferably, a first shape memory alloy element of the one or more shape memory alloy elements is coupled to a first side of the slider and a second shape memory alloy element of the one or more shape memory alloy elements is coupled to a second side of the slider.

Preferably, the valve further comprises an electrical contact coupled to the one or more shape memory alloy elements.

According to another aspect of the invention, a method for controlling a flow of a fluid through a valve including a shape memory alloy element coupled to a slider, the method comprises the steps of:
energizing a shape memory alloy element to above a transformation temperature, wherein the shape memory alloy element transforms from a first state to a second state at the transformation temperature; and
moving a slider from a first position to at least a second position as the shape memory alloy element transforms from the first state to the second state to actuate the valve.

Preferably, the method further comprises the step of actuating a fluid control member from its rest position with the slider to open a fluid flow path between two or more ports.

Preferably, the step of energizing the shape memory alloy component comprises energizing one or more electrical contacts coupled to the shape memory alloy component.

Preferably, the step of energizing the shape memory alloy component comprises energizing one or more electrical contacts coupled to the shape memory alloy component with a pulse width modulation signal.

Preferably, the method further comprises the step of:
reducing a biasing force acting on a slider using the shape memory alloy element as the shape memory alloy element transforms from the first state to a second state.

Preferably, the method further comprises the steps of:
de-energizing the shape memory alloy element, wherein the shape memory alloy element transforms from the second state to the first state; and
increasing a biasing force acting on the slider to retain the slider in the second position.

Preferably, the method further comprises the steps of:
energizing a second shape memory alloy element to above a transformation temperature, wherein the second shape memory alloy element transforms from a first state to a second state at the transformation temperature; and
moving the slider from the second position to at least a third position as the second shape memory alloy element transforms from the first state to the second state.

Preferably, the method further comprises the step of:
reducing a biasing force acting on the slider using the second shape memory alloy element as the second shape memory alloy element transforms from the first state to a second state.

Preferably, the method further comprises the steps of:
de-energizing the shape memory alloy element, wherein the shape memory alloy element transforms from the second state to the first state;
energizing a second shape memory alloy element, wherein the second shape memory alloy element transforms from a first state to a second state; and
returning the slider to the first position as the second shape memory alloy element transforms from the first state to the second state.

Preferably, the method further comprises the step of repositioning a fluid control member to its rest position as the slider returns to its first position.

DETAILED DESCRIPTION OF THE INVENTION

Figure 1:
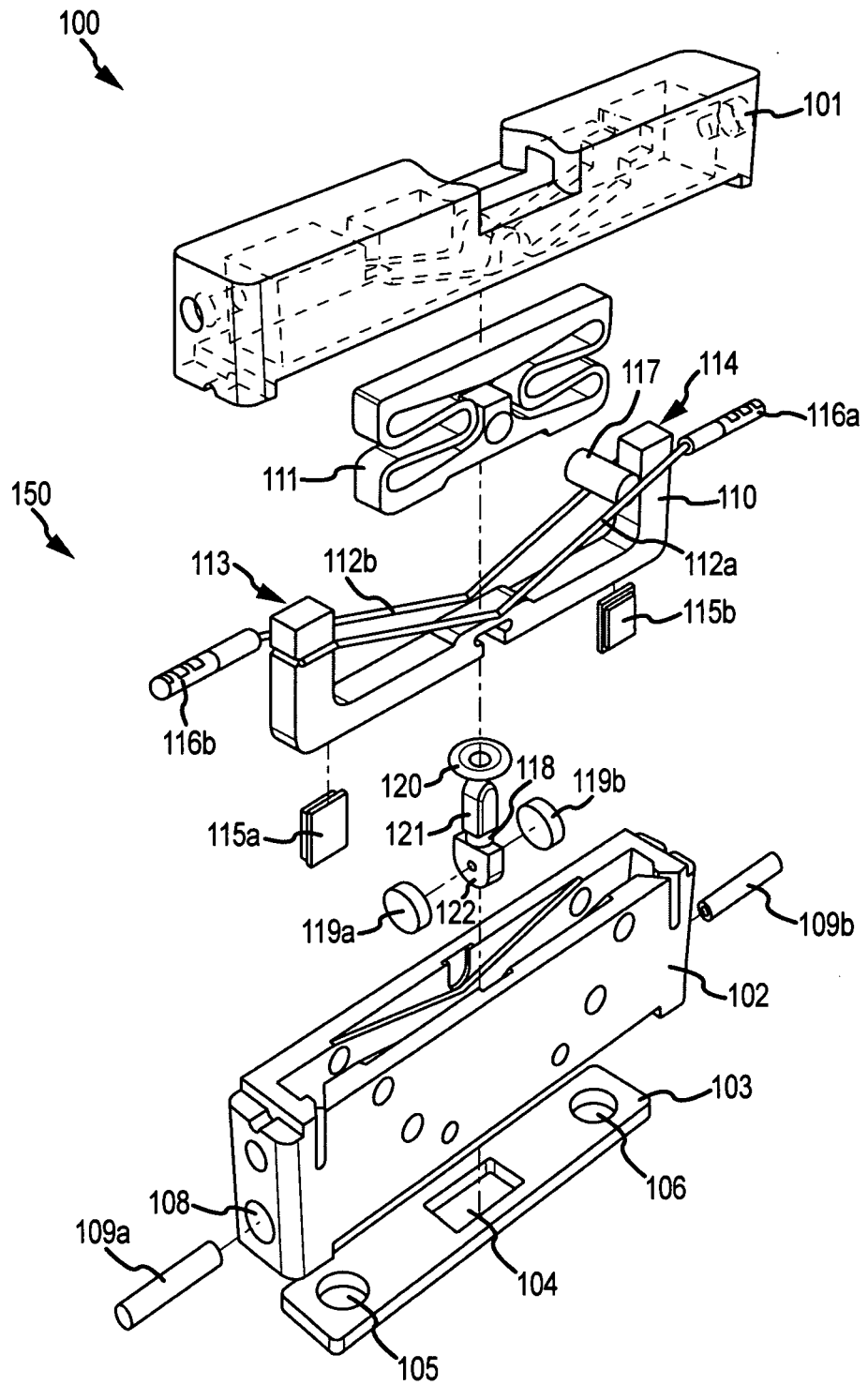
FIG. 1 shows an exploded view of a shape memory alloy actuated valve according to an embodiment of the invention.
Figure 2:
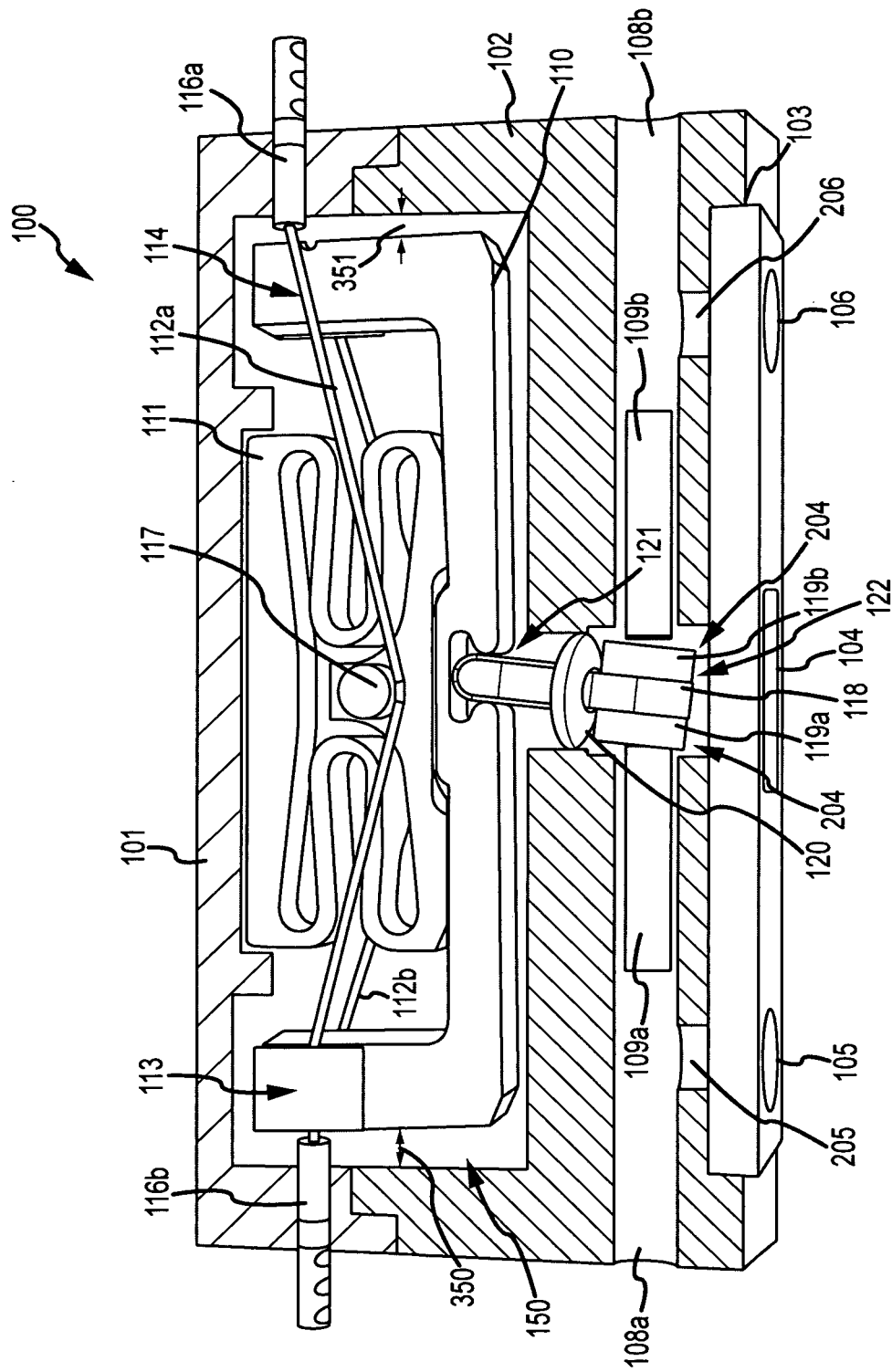
FIG. 2 shows a partial cross-sectional view of the valve according to an embodiment of the invention.
Figure 3:
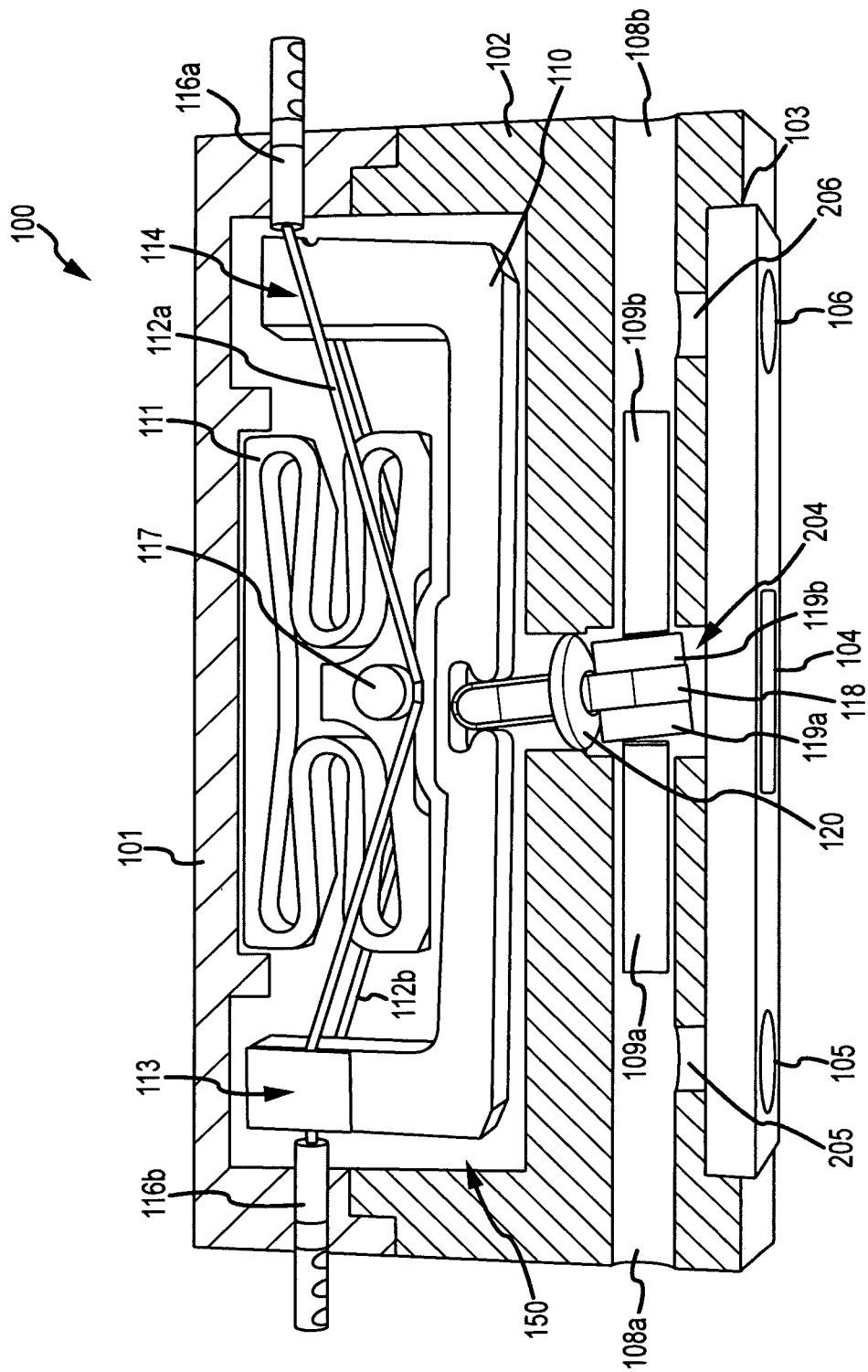
FIG. 3 shows a partial cross-sectional view of the valve according to another embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows an exploded view of a valve 100 according to an embodiment of the invention. According to the embodiment shown, the valve 100 includes a cover 101, a body 102, and a gasket 103. The cover 101 can enclose at least a portion of the body 102. In some embodiments, the cover 101 may enclose a portion of the gasket 103 as well. The cover 101 and body 102 can advantageously protect the inner components of the valve 100 as well as direct fluid flowing through the valve 100. The valve 100 can be provided to control the flow of a pressurized fluid such as pneumatic or hydraulic fluid, for example. However, it should be understood that any fluid may be used with the valve 100 and the particular examples provided should in no way limit the scope of the present invention.

According to an embodiment of the invention, the gasket 103 can be provided to form a substantially fluid-tight seal between the valve 100 and a pressurized fluid source (not shown) and/or corresponding fluid actuated devices (not shown) where the pressurized fluid can be directed. According to the embodiment shown, the gasket 103 comprises a plurality of apertures 104, 105, 106. The apertures 104, 105, 106, can correspond to associated ports formed in the body 102. For example, the body 102 may comprise a first port 204, a second port 205, and a third port 206 (See FIG. 2). The gasket 103 can be provided in order to separate and seal the various ports of the valve 100. As described in more detail below, the first port 204 can communicate with both the second port 205 and the third port 206. According to an embodiment of the invention, the first port 204 can be provided to receive a pressurized fluid from a pressurized fluid source (not shown) and the second and third ports 205, 206 can be provided to output the pressurized fluid to one or more external devices (not shown). The particular devices coupled to the valve 100 are not important for the purposes of the present invention and therefore, should not limit the scope of the present invention. It should be appreciated that the flow orientation of the ports 204, 205, 206 could be reversed from the direction described above. In other words, the second and third ports 205, 206 could be provided with a pressurized fluid that can be exhausted through the first port 204. The gasket 103 may be coupled to an external fluid source using tubes, pipes, couplings, etc. Although three ports are shown, the valve 100 could comprise two ports or more than three ports, for example. Therefore, the particular number of ports provided should not limit the scope of the present invention.

According to an embodiment of the invention, the body 102 can be coupled to the cover 101 and the gasket 103. The body 102 can be adapted to receive at least some of the operating components of the valve 100, such as a valve actuator, which is generally designated as 150. The valve actuator 150 is provided to actuate the valve 100 in order to open a fluid communication path between various ports 204, 205, 206 of the valve 100. The valve actuator 150 includes a slider 110 and one or more shape memory alloy elements 112. The valve actuator 150 may also include a fluid control member 118 along with other valve components, which are described below. The body 102 can also provide a substantially fluid-tight communication path for the operating fluid.

In addition to the components described above, the body 102 may also include apertures 108 that are adapted to accept nozzles 109. In the embodiment shown, two nozzles 109a, 109b are shown. Although only one aperture 108 is visible in FIG. 1, it should be appreciated that a second aperture 108b is located on the opposite side of the body 102 and is adapted to receive the second nozzle 109b (See FIGS. 2 & 3). The nozzles 109a, 109b can provide a communication path between the first port 204 and the second and third ports 205, 206 respectively. According to an embodiment of the invention, once the nozzles 109a, 109b are installed into the body 102, the apertures 108 may be closed to prevent fluid from escaping. Therefore, fluid will flow through the nozzles 109a, 109b to the ports 204, 205, 206 rather than out through the apertures 108.

According to an embodiment of the invention, the valve 100, and more specifically, the valve actuator 150, also includes a slider 110. The slider 110 can be sized to fit within the body 102. According to an embodiment of the invention, the body 102 and the slider 110 may be sized such that friction between the body 102 and the slider 110 can prevent the slider 110 from moving within the body 102 until a threshold actuation force is applied to the slider 110. In some embodiments, the body 102 and slider 110 may be shaped such that the frictional force between the two components increases as the slider 110 is pressed further into the body 102. For example, if the slider 110 is placed in the body 102 without a biasing force acting on the slider 110 to bias the slider 110 further into the body 102, the slider 110 may be able to move with a relatively weak force applied. However, if a biasing force is provided that presses the slider 110 further down in the body 102, the friction between the slider 110 and the body 102 may restrict the movement of the slider 110 or require a substantially stronger force to actuate the slider 110 with respect to the body 102.

According to an embodiment of the invention, the valve actuator 150 can include a biasing member 111. The biasing member 111 can be provided to bias the slider 110 into the body 102. The biasing member 111 may comprise a spring, as shown, or may comprise some other biasing device as is generally known in the art. According to an embodiment of the invention, the biasing member 111 can be compressed by the cover 101 and engage the slider 110 in order to bias the slider 110 further into the body 102. In this manner, the biasing member 111 can act on the slider 110 to increase the actuation force required to move the slider 110 relative to the body 102. The actuation force may be increased due to friction between the slider 110 and the body 102 or between the slider 110 and the biasing member 111. It should be appreciated that in other embodiments, the biasing member 111 may be omitted. This may particularly true when the valve 100 will be oriented in the direction shown in the figures and the weight of the slider 110 is sufficient to bias the slider 110 into the body 102. The weight of the slider 110 may therefore be sufficient to retain the slider 110 in its current position absent an actuation force.

According to an embodiment of the invention, the valve actuator 150 can also include one or more shape memory alloy (SMA) elements 112. Although two SMA elements 112a, 112b are shown, it should be appreciated that the particular number of SMA elements can vary. Therefore, the particular number of SMA elements 112 utilized should not limit the scope of the present invention. According to an embodiment of the invention, the SMA elements 112 are coupled to one side of the slider 110. For example, as shown, the first SMA element 112a is coupled to the first side 113 of the slider 110, but is not coupled to the second side 114 of the slider 110. Conversely, the second SMA element 112b is shown coupled to the second side 114 of the slider 110, but is not coupled to the first side 113 of the slider 110. It should be appreciated that although the SMA elements 112 may be coupled to both sides of the slider 110, such a configuration may limit the total actuation movement of the slider 110 upon energizing the SMA elements 112. The SMA elements 112 may be coupled to the slider 110 in a variety of ways including, but not limited to, brazing, bonding, welding, adhesives, mechanical attachments, etc.

According to an embodiment of the invention, the valve 100 also includes one or more conductive plates 115. The conductive plate 115a can provide electrical contacts to the end of the SMA wire 112a coupled to the first side 113 of the slider 110. The conductive plate 115b can provide electrical contact for the end of the SMA wire 112b coupled to the second side 114 of the slider 110. The conductive plates 115 may be coupled to the slider 110 in a variety of ways and the particular method should not limit the scope of the invention.

According to an embodiment of the invention, the SMA elements 112 include electrical contacts 116. In some embodiments, the electrical contacts 116 can be coupled to the cover 101. In other embodiments, the electrical contacts 116 may extend from the cover 101, with a portion of the SMA element 112 proximate the electrical contact 116 being coupled to the cover 101. The electrical contacts 116 can be energized to thermoelectrically heat the SMA element 112. Thermoelectrically heating the SMA element 112 results in a voltage being applied between the electrical contact 116 and the corresponding electrical plate 115. Shape memory alloys are metals that are generally known for their physical transformation above a transformation temperature. By combining the appropriate alloys, the transformation temperature of the SMA element 112 can be determined. The transformation temperature is generally understood as the temperature at which the SMA material starts to transform from a martensite crystal structure to an austentite crystal structure. When the SMA element 112 is below the transformation temperature, the metal remains in the martensite crystal structure. In the martensite crystal structure, the metal can be physically deformed into a first size and/or shape and can remain in that shape while below the transformation temperature. However, upon heating to above the transformation temperature, the material begins to transform into the austentite crystal structure where the alloy returns to its "memorized", pre-deformed, size and/or shape. The transformation that occurs in SMA materials is relatively fast as no diffusion occurs as in many types of phase changes. This unique property of SMA materials can be utilized in the valve 100 in order to selectively open or close the valve 100 as discussed below.

According to an embodiment of the invention, the SMA elements 112 can be stretched (deformed) while below the transformation temperature by a pin 117, which can be coupled to the biasing member 111 such that when the biasing member 111 is in place and compressed, the pin 117 contacts the SMA elements 112 to apply a biasing force on the SMA elements 112. With the SMA elements 112 coupled to the slider 110 and the cover 101, the biasing force applied by the pin 117 causes the SMA elements 112 to stretch while below the transformation temperature. It should be appreciated in other embodiments when the biasing member 111 is omitted, the pin 117 may be coupled directly to the slider 110 or omitted altogether. Upon energizing the electrical contacts 116, the temperature of the SMA element 112 rises to above the transformation temperature, thereby transforming into its austenitic state. As the SMA element 112 transforms into its austenitic state, the SMA element 112 returns to its memorized pre-deformed size. As the SMA element 112 returns to its pre-deformed size, the SMA element 112 overcomes the biasing force of the biasing member 111. As a result, the biasing force acting on the slider 110 decreases. As the biasing force acting on the slider 110 reduces, the frictional force experienced between the slider 110 and the body 102 decreases and less force is required to actuate the slider 110 from a first position to a second position. According to an embodiment of the invention, the actuation force created by the SMA element 112 as the SMA element 112 transforms from its first state (martensitic) into its second state (austenitic) is above the threshold force required to actuate the slider 110 relative to the body 102 once the biasing force acting on the slider 110 by the biasing member 111 is reduced. Therefore, once the SMA element 112 overcomes the biasing force of the biasing member 111, the SMA element 112 also actuates movement of the slider 110 from its first position to its second position. According to another embodiment of the invention, the actuation force created by the SMA element 112 is above the threshold force required to actuate the slider 110 relative to the body 102 even without reducing the biasing force. Although this may be useful when the biasing member 111 is omitted, this may be the case even with the biasing member 111 included in the valve 100.

According to the embodiment shown, as the slider 110 is actuated from its first position to its second position the slider 110 moves towards the electrical contact 116 that is energized. This is because the electrical contact 116 is coupled to the cover 101 and the end of the SMA element 112 opposite the electrical contact 116 is coupled to the slider 110. It should be appreciated that in other embodiments, the orientation of the coupling of the SMA element 112 and the electrical contact 116 could be reversed. In other words, the electrical contact 116 could be coupled to the slider 110 with an end of the SMA element 112 being coupled to the cover 101. Furthermore, the SMA element 112 may be coupled to the slider 110 such that the slider 110 moves away from the electrical contact 116. In yet another embodiment, the SMA element 112 may be coupled to the body 102 and the slider 110. Therefore, the particular embodiment shown in the figures should not limit the scope of the present invention.

According to an embodiment of the invention, the valve 100 includes a fluid control member 118. The fluid control member 118 can be coupled to the slider 110. According to an embodiment of the invention, one or more poppet members 119 can be coupled to the fluid control member 118. Although in the embodiment shown, two poppet members 119a, 119b are provided, it should be appreciated that in some embodiments, such as a 2/2 valve, only one poppet member 119 may be required. Furthermore, it should be appreciated that more than two poppet members 119 may be provided. The poppet members 119a, 119b can seal against the first and second nozzles 109a, 109b, respectively. It should be appreciated that in some embodiments the fluid control member 118 may be omitted and the poppet members 119 can be coupled directly to the slider 110.

According to an embodiment of the invention, a sealing member 120 can be provided to prevent fluid from reaching the slider 110. The sealing member 120 may direct fluid into one of the nozzles 109 when the seal between the poppet member 119 and the nozzle 109 is broken due to movement of the fluid control member 118. Although the sealing member 120 is shown as comprising an O-ring, it should be appreciated that the sealing member 120 may comprise any manner of seal as is generally known in the art. Therefore, the particular sealing member 120 used should not limit the scope of the present invention. In addition to sealing off the slider 110 from the fluid, the sealing member 120 can also provide a pivot point for the fluid control member 118.

As the slider 110 is actuated from the first position to the second position in response to the transformation of the SMA elements 112, the first end 121 of the fluid control member 118, which can be coupled to the slider 110, can move away from its rest position. The movement away from the rest position may be in the same direction as the slider 110. With the fluid control member 118 pivoting near a mid-point, the second end 122 of the fluid control member 118 can move in a direction opposite that of the slider 110. According to another embodiment of the invention, the entire fluid control member 118 may move in the same direction as the slider 110 instead of pivoting. Advantageously, in either embodiment, the fluid control member 118 can unseal one of the nozzles 109 in response to the actuation of the slider 110.

Attention is now drawn to FIGS. 2 & 3 for a discussion on the operation of the valve 100. FIG. 2 shows a partial cross-sectional view of the valve 100 in a de-actuated state according to an embodiment of the invention, while FIG. 3 shows a partial cross-sectional view of the valve 100 in an actuated state according to an embodiment of the invention.

FIG. 2 shows the SMA elements 112 below the transformation temperature. While below the transformation temperature, the SMA elements 112 can be stretched or otherwise deformed. In the embodiment shown, the pin 117 coupled to the biasing member 111 can stretch or otherwise deform the SMA elements 112. According to an embodiment of the invention, the biasing member 111 can be compressed by the cover 101. According to another embodiment of the invention, the biasing member 111 may be coupled to and compressed by the body 102. When compressed, the biasing member 111 can provide a downward (as shown in FIG. 2) biasing force on the slider 110. As discussed above, in some embodiments, the biasing member 111 may be omitted and the downward biasing force may be provided by the weight of the slider 110. With the biasing force applied to the slider 110, actuation of the slider 110 requires a threshold actuation force and may not freely move within the body 102. The threshold actuation force may be determined by the size and/or shape of the slider 110 as well as the body 102 among other things. In the position shown in FIG. 2, the slider 110 is in a first position. According to an embodiment of the invention, the first position corresponds to the slider 110 being positioned such that fluid at the first port 204 can enter the nozzle 109b and exit through the third port 206. However, fluid is substantially prevented from entering the nozzle 109a and thus, fluid communication is closed between the first port 204 and the second port 205. As can be seen this position is created because the spacing 350 between the first side 113 of the slider 110 and the body 102 is substantially larger than the spacing 351 between the second side 114 of the valve actuator and the body 102. This results in the fluid control member 118 being pivoted around the sealing member 120.

As shown in FIG. 2, in the de-activated state, the biasing member 111 stretches the SMA elements 112a, 112b and also provides a biasing force on the slider 110. Therefore, the slider 110 is pressed into the body 102 with the friction between the slider 110 and the body 102 restricting movement of the slider 110. In addition, the fluid control member 118 is shown in its first position as sealing poppet members 119a against its respective nozzle 109a. Therefore, pressurized fluid is substantially prevented from entering nozzle 109a and the second port 205 cannot communicate with the first port 204.

FIG. 3 shows the valve 100 after the second SMA element 112b has been energized. Upon energizing the electrical contact 116b, the resistance in the SMA wire 112b causes the wire 112b to heat via thermoelectric heating to a temperature above the transformation temperature. Although the electrical contacts 116 are described, it should be appreciated that in other embodiments, a separate heating element (not shown) may be used to energize the SMA elements 112. Therefore, the present invention should not be limited to the electrical contacts 116. It should therefore be appreciated that energizing the SMA elements 112 may comprise thermoelectrically energizing or some other form of thermal energy, such as provided by a separate heating element, for example.

Once the temperature of the SMA element 112b rises to above the transformation temperature, the SMA element 112b transforms from its first state (martensitic) to its second state (austenitic). According to an embodiment of the invention, the second state comprises the SMA element's pre-deformed (pre-stretched) size. As the SMA element 112b transforms to its second state, the SMA element 112b can overcome the biasing force of the biasing member 111. As a result, the biasing force from biasing member 111 acting on the slider 110 is substantially reduced and in some embodiments, eliminated. Although a substantial gap is shown between the biasing member 111 and the slider 110 in FIG. 3, it should be appreciated that in some embodiments this gap may be very small and the size has been exaggerated in order to better understand the operation of the valve 100. According to embodiments where the biasing member 111 is omitted, the SMA element 112b may simply overcome the biasing force created by the weight of the slider 110 to actuate the slider 110.

With the biasing force acting on the slider 110 removed or at least reduced, the slider 110 can rise slightly within the body 102 and the frictional force between the slider 110 and the body 102 is reduced. As a result, the actuation force required to actuate the slider 110 and slide the slider 110 relative to the body 102 is reduced. As discussed above, the SMA elements 112 are generally coupled to one end of the slider 110 with the other end of the SMA element 112 coupled to the cover 101. Therefore, as the second SMA element 112b overcomes the biasing force of the biasing member 111, to reduce the frictional force between the slider 110 and the body 102, the SMA element 112b also provides an actuation force on the slider 110. In FIG. 3, this actuation force would be to the left because the SMA element 112b is coupled to the slider 110 on the second side 114, but is not coupled to the slider 110 on the first side 113. Therefore, with the electrical contact 116b coupled to the cover 101, the SMA element 112b pulls the slider 110 to the left. As can be seen, the spacing 350 between the first side 113 of the slider 110 and the body 102 is substantially smaller than the spacing 351 between the second side 114 of the valve actuator and the body 102 as the slider 110 has moved to the left from a first position to a second position.

According to an embodiment of the invention, as the slider 110 moves in a first direction, the first end 121 of the fluid control member 118 also moves in the first direction. As the first end 121 of the fluid control member 118 moves in the first direction (to the left as shown in FIG. 3), the fluid control member 118 can pivot around the sealing member 120 and therefore, the second end 122 of the fluid control member 118 can move in a second direction (to the right as shown in FIG. 3), which is substantially opposite the first direction. The amount of movement of the fluid control member 118 is shown exaggerated to better illustrate the operation of the valve. Therefore, it should be appreciated that in some embodiments, the movement of the fluid control member 118 is much smaller. The movement of the fluid control member 118 breaks the seal between the first poppet 119a and the nozzle 109a, and seals the second poppet 119b against the second nozzle 109b. As a result, fluid at the first port 204 can enter the nozzle 109a and exit through the third port 205. However, fluid is now substantially prevented from entering the nozzle 109b and thus, fluid communication is closed between the first port 204 and the third port 206.

If the SMA element 112b is de-energized while the slider 110 is in the position shown in FIG. 3, the temperature of the SMA element 112b will fall to below the transformation temperature and can be stretched once again by the biasing member 111 and the pin 117 or the weight of the slider 110. The biasing force of the biasing member 111 provides the majority of the force acting on the SMA element 112b and therefore, the biasing member 111 can engage the slider 110 once again as the SMA element 112b stretches. As the biasing member 111 engages the slider 110, the biasing force acting on the slider 110 presses down on the slider 110, thereby increasing the frictional force between the slider 110 and the body 102. The frictional force between the slider 110 and the body 102 can retain the slider 110 in the position shown in FIG. 3 even after the SMA element is de-energized.

In embodiments where the biasing member 111 is omitted, upon de-energizing the SMA element 112b, the slider 110 is retained in the position shown in FIG. 3. This is because absent the actuation force provided by the SMA element 112b, the biasing force created by the weight of the slider 110 is sufficient such that the friction between the slider 110 and the body 102 substantially prevents movement of the slider 110.

In order to bring the slider 110 back to its first position, the first SMA element 112a can be actuated in a similar manner. It may also be desired to open fluid communication between the central port 104 and both the first port 105 and the second port 206. In order to do so starting from the second position as shown in FIG. 3, the first SMA wire 112a can be actuated during a short time (less than the time needed to travel from the second position to the first position). If the first SMA wire 112a is de-actuated before the slider 110 can reach the first position, there will be a gap between nozzle 109a and poppet 119a and a gap between nozzle 109b and poppet 119b. This third intermediate position may be kept without consuming power in a similar manner as described above for the first and second positions.

It should be appreciated that the valve 100 described above can advantageously be actuated to a desired position by energizing at least one of the SMA elements 112. Without an actuation force acting on the slider 110, upon de-energizing the SMA element 112, the slider 110 can remain in the actuated position. According to an embodiment of the invention, the slider 110 remains in the actuated position due to friction between the slider 110 and the body 102. Therefore, the valve 100 of the present invention can retain an actuated position in the absence of a continued supply of power to the SMA element 112. This is in contrast to many prior art electrically actuated valves that require a continuous supply of energy to remain in an actuated position. As a result, prior art valves typically require more power to operate than the valve 100 of the present invention. Although two SMA elements 112a, 112b are shown and described, it should be appreciated that in some embodiments only one SMA element 112 is provided and the slider 110 can be returned to its original position using some other actuation force such as a mechanical actuator or the weight of the valve actuator, mechanical spring, etc. Therefore, the present invention should not be limited to requiring two SMA elements.

The operation of the valve 100 can be performed quickly and quietly. The speed of actuation can be controlled based, in part, on the energy supplied to the electrical contacts 116, for example. Furthermore, the energy supplied to the SMA element 112 can be controlled to create a proportional valve. In one example, the energy supplied to the SMA element 112 can be controlled by a pulse width modulation signal. Utilizing a pulse width modulation signal, the temperature of the SMA element 112 can be controlled to oscillate between a first temperature when the SMA element 112 begins to transform to the austenite state (austenite start temperature) and a second temperature when the SMA element 112 has fully transformed into the austenite state (austenite finish temperature). Because, the transformation of the martensite state into austenite state occurs progressively and the two states co-exist during the transition. This variation of the proportion of each state is responsible for the proportional behavior of the valve. Therefore, the fluid control member 118 can be held in a partially open position as the SMA element 112 oscillates between its martensitic state to its austenitic state. However, other methods may be employed.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other valves, and not just to the embodiments described above and shown in the accompanying figures. Accordingly, the scope of the invention should be determined from the following claims.

We claim:

1. A valve (100), comprising:
    a body (102) including a plurality of ports (204, 205, 206);
    a cover (101) coupled to the body (102);
    a biasing member (111) positioned between the cover (101) and a slider (110);
    a valve actuator (150) positioned within the body (102), including:
        the slider (110) pressed into the body (102) by the biasing member (111), wherein a frictional force between the slider (110) and the body (102) increases as the slider (110) is pressed further into the body (102); and
        one or more shape memory alloy elements (112a, 112b) coupled to at least one side (113, 114) of the slider (110), wherein energizing at least one of the shape memory alloy elements (112a, 112b) of the one or more shape memory alloy elements (112a, 112b) provides a threshold actuation force that overcomes the frictional force between the slider (110) and the body (102) in order to actuate the valve (100) to an actuated state;
        wherein the frictional force between the slider (110) and the body (102) prevents the slider (110) from moving with respect to the body (102) from the actuated state when the one or more shape memory alloy elements (112a, 112b) are de-energized.

2. The valve (100) of claim 1, wherein the shape memory alloy element (112a, 112b) is also coupled to the cover (101).

3. The valve (100) of claim 1, further comprising a fluid control member (118) coupled to the slider (110) and movable between a rest position and at least a first actuated position.

4. The valve (100) of claim 1, further comprising one or more poppet members (119a, 119b) coupled to a fluid control member (118).

5. The valve (100) of claim 4, further comprising one or more nozzles (109a, 109b) configured to seal against one or more poppet members (119a, 119b).

6. The valve (100) of claim 1, further comprising a gasket (103) including a plurality of apertures (104, 105, 106) corresponding to the plurality of ports (204, 205, 206).

7. The valve (100) of claim 1, wherein a first shape memory alloy element (112a) of the one or more shape memory alloy elements is coupled to a first side (113) of the slider (110) and a second shape memory alloy element (112b) of the one or more shape memory alloy elements is coupled to a second side (114) of the slider (110).

8. The valve (100) of claim 1, further comprising an electrical contact (116a, 116b) coupled to the one or more shape memory alloy elements (112a, 112b).

9. A method for controlling a flow of a fluid through a valve including a shape memory alloy element coupled to a slider, the method comprising steps of:
    pressing the slider into a body of the valve to provide a frictional force between the slider and the body to prevent movement of the slider from a first position to a second position with respect to the body;
    energizing the shape memory alloy element to above a transformation temperature, wherein the shape memory alloy element transforms from a first state to a second state at the transformation temperature to provide a threshold actuation force on the slider, which overcomes the frictional force between the slider and the body; and
    moving the slider from the first position to at least the second position as the shape memory alloy element transforms from the first state to the second state to actuate the valve.

10. The method of claim 9, further comprising a step of actuating a fluid control member from its rest position with the slider to open a fluid flow path between two or more ports.

11. The method of claim 9, wherein the step of energizing the shape memory alloy component comprises energizing one or more electrical contacts coupled to the shape memory alloy component.

12. The method of claim 9, wherein the step of energizing the shape memory alloy component comprises energizing one or more electrical contacts coupled to the shape memory alloy component with a pulse width modulation signal.

13. The method of claim 9, further comprising a step of:
    reducing a biasing force acting on the slider using the shape memory alloy element as the shape memory alloy element transforms from the first state to a second state.

14. The method of claim 9, further comprising steps of:
    de-energizing the shape memory alloy element, wherein the shape memory alloy element transforms from the second state to the first state; and
    increasing a biasing force acting on the slider to increase the frictional force between the slider and the body to retain the slider in the second position.

15. The method of claim 14, further comprising steps of:
    energizing a second shape memory alloy element to above a transformation temperature, wherein the second shape memory alloy element transforms from a first state of the second shape memory alloy to a second state of the second shape memory alloy at the transformation temperature; and
    moving the slider from the second position to at least a third position using the second shape memory alloy element as the second shape memory alloy element transforms from the first state to the second state.

16. The method of claim 15, further comprising a step of:
    reducing a biasing force acting on the slider using the second shape memory alloy element as the second shape memory alloy element transforms from the first state to a second state.

17. The method of claim 9, further comprising steps of:
    de-energizing the shape memory alloy element, wherein the shape memory alloy element transforms from the second state to the first state;
    energizing a second shape memory alloy element, wherein the second shape memory alloy element transforms from a first state to a second state; and
    returning the slider to the first position as the second shape memory alloy element transforms from the first state to the second state.

18. The method of claim 17, further comprising a step of repositioning a fluid control member to its rest position as the slider returns to its first position.

* * * * *